Figures 1, 2:
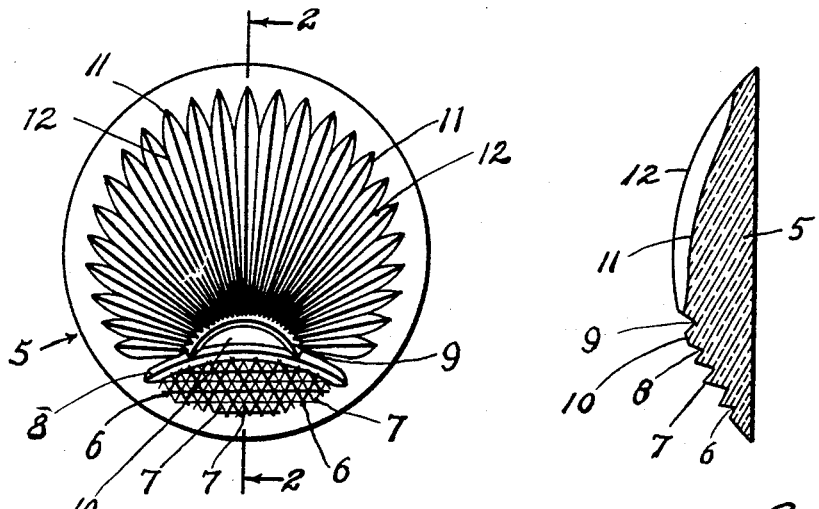

Dec. 17, 1929.　　　A. J. OBERG ET AL　　　1,739,607

SPECIAL CUT LENS

Filed Jan. 24, 1928

INVENTORS:
Anton J. Oberg and
Robert R. Stoefen
BY
Robt. D. Pearson
ATTORNEY.

Patented Dec. 17, 1929

1,739,607

UNITED STATES PATENT OFFICE

ANTON J. OBERG AND ROBERT R. STOEFEN, OF LOS ANGELES, CALIFORNIA

SPECIAL CUT LENS

Application filed January 24, 1928. Serial No. 249,088.

This invention relates to special cut lenses of the type having at least one convex face, such convex face being provided with a series of grooves or other indentations which are cut into said face for the purpose of producing a prismatic effect upon rays of light passing through the lens.

An object of the invention is to provide the convex surface of a lens with indentations of a character designed to produce an ornamental image, design or picture upon a suitable background when light is passed through the lense from a color projecting or image projecting machine.

A further object is to provide a lens having a convex face furnished with cuts and indentations of a character which harmonize with each other in producing the desired effect and which at the same time are adapted to be cut into the surface of the lens in a rapid, inexpensive manner.

Other objects and advantages may hereinafter appear.

Referring to the accompanying drawings, which illustrate a preferred embodiment of the invention Figure 1 is a face view looking at the convex of a plano-convex lens embodying the invention.

Figure 2 is a vertical section on line 2—2 of Figure 1.

Referring in detail to the drawings, 5 designates a plano-convex lens having near one side of its convex face a series of intersecting V-shaped grooves 6 which extend across an approximately semicircular area of the lens in three directions thus forming between them a series of pyramidal projections 7. Along the convex edge of this pyramidal area extends a relatively deep V-shaped groove 8 and at the mid-length of said groove 8 is placed a relatively short V-shaped arcuate groove 9 thus providing a crescent shaped elevation 10 between said grooves 8 and 9. Radiating across the face of the prism from said grooves 9 and 8 are a series of straight V-shaped grooves 11 between which intervene the ridges 12.

When colored light is passed through this lens from a color projecting machine the rays of light enter the convex side of the lens pass out the other side thereof and are thereby, after being diverged to the extent desired, directed upon a suitable screen. The particular design herein illustrated portrays the rising sun or other luminous body together with the beams of light which it radiates. It is to be understood, however, that the invention is not limited to depicting a scene of this kind, but may be used to project upon the screen a great variety of natural scenery and other images.

We claim:

1. A lens having a convex surface provided with a plurality of indentations cut thereinto occupying a definite restricted area thereof and arranged harmoniously with relation to each other to produce an ornamental image when rays of light are directed through the lens, and another area provided with elongated indentations constructed and arranged to form on the screen a halo in symmetrical relation to the first recited area.

2. A lens having a convex face a portion of which is provided with a plurality of grooves arranged to form pyramidal projections, these pyramidal projections being located near one edge of the lens only, and a series of radiating grooves extending across the lens from the portion thereof which is occupied by said pyramidal projections, the said radiating grooves being adapted to simulate upon the screen rays radiating from a luminous body represented by the first mentioned grooves.

3. A lens having a convex face a relatively small portion of which is provided at one side with an area having indentations to produce ornamental diffusion of light, and a series of radiating grooves extending across the lens from the area thereof first recited, said indentations being adapted to cause the light to simulate a luminous body, and said grooves being adapted to cause light passing therethrough to simulate light rays radiating from said body.

In testimony whereof we affix our signatures.

ANTON J. OBERG.
ROBERT R. STOEFEN.